(12) United States Patent
Hoffmann et al.

(10) Patent No.: US 7,198,439 B2
(45) Date of Patent: Apr. 3, 2007

(54) QUICK CHUCK

(75) Inventors: Erhard Hoffmann, Leinfelden-Echterdingen (DE); Joachim Hecht, Magstadt (DE); Siegfried Keusch, Deizisau (DE)

(73) Assignee: Robert Bosch GmbH, Stuttgart (DE)

( * ) Notice: Subject to any disclaimer, the term of this patent is extended or adjusted under 35 U.S.C. 154(b) by 500 days.

(21) Appl. No.: 10/812,146

(22) Filed: Mar. 29, 2004

(65) Prior Publication Data
US 2004/0195784 A1 Oct. 7, 2004

(30) Foreign Application Priority Data
Apr. 4, 2003 (DE) ................. 103 15 407

(51) Int. Cl.
*B23B 31/04* (2006.01)
(52) U.S. Cl. ............... 408/240; 279/60; 279/902
(58) Field of Classification Search ................ 279/60, 279/64, 65, 902, 61, 62, 63; 408/240; *B23B 31/04*
See application file for complete search history.

(56) References Cited

U.S. PATENT DOCUMENTS

| | | | | |
|---|---|---|---|---|
| 1,473,488 A * | 11/1923 | McConnell | ............ | 279/62 |
| 1,476,903 A * | 12/1923 | McConnell | ............ | 279/62 |
| 1,748,511 A * | 2/1930 | Johnson | ............ | 279/60 |
| 1,907,553 A * | 5/1933 | Lundin | ............ | 279/55 |
| 2,253,345 A * | 8/1941 | Palmgren | ............ | 279/60 |
| 2,544,088 A | 3/1951 | Hollis | | |
| 3,244,428 A * | 4/1966 | Rohm | ............ | 279/60 |
| 4,456,270 A * | 6/1984 | Zettl et al. | ............ | 279/62 |
| 4,627,626 A | 12/1986 | Roehm | | |
| 4,711,457 A | 12/1987 | Wezel | | |
| 4,711,547 A | 12/1987 | Iizuka | | |
| 4,968,191 A | 11/1990 | Palm | | |
| 5,624,125 A | 4/1997 | Roehm | | |
| 5,741,016 A | 4/1998 | Barton et al. | | |
| 5,921,563 A | 7/1999 | Huggins et al. | | |
| 6,505,840 B2 | 1/2003 | Huggins et al. | | |
| 6,843,484 B2 * | 1/2005 | Schroeder | ............ | 279/60 |
| 2004/0080083 A1 | 4/2004 | Czado | | |
| 2004/0251641 A1* | 12/2004 | Hoffmann et al. | ............ | 279/62 |
| 2005/0023774 A1* | 2/2005 | Mack | ............ | 279/60 |

FOREIGN PATENT DOCUMENTS

| | | | |
|---|---|---|---|
| DE | 347 557 | | 1/1922 |
| DE | 3501870 A1 | * | 7/1986 |
| DE | 3510020 A1 | * | 9/1986 |
| DE | 101 09 474 C1 | | 6/2002 |
| DE | 101 08 490 A1 | | 9/2002 |
| DE | 10109490 A1 | * | 9/2002 |
| EP | 1 380 372 A1 | | 1/2004 |
| GB | 191959 | * | 1/1923 |

* cited by examiner

*Primary Examiner*—Daniel W. Howell
(74) *Attorney, Agent, or Firm*—Michael J. Striker

(57) ABSTRACT

A quick chuck for a hand power tool has an actuating element, at least one arresting element for receiving a clamping support force, a control device having at least one control unit for controlling the at least one arresting element, the arresting element controllable by the control device producing a form-locking connection for receiving the clamping support force.

14 Claims, 5 Drawing Sheets

QUICK CHUCK

BACKGROUND OF THE INVENTION

The present invention relates to a quick chuck.

German patent document DE 10109490 discloses a quick chuck for a hand power tool, which has a control device for controlling arresting means for receiving a clamping support force. The quick chuck has an axially displaceable actuating sleeve which is coupled with a turnably supported toggle of the control device. When the actuating sleeve is displaced rearwardly in an axial direction facing away from a receiving region of the quick chuck, the toggle is turned and thereby through a transmission means, a force transmitting connection for receiving the clamping support force is produced between the arresting means formed by plate springs and a base body of the fast chuck.

SUMMARY OF THE INVENTION

Accordingly, it is an object of the present invention to provide a quick chuck, in particular for a hand power tool which avoids the disadvantages of the prior art.

More particularly, it is an object of the present invention to provide a quick chuck, in particular for a hand power tool, with an actuating element and with a control device, which has at least one control means for controlling at least one arresting means for receiving a clamping support force.

It is proposed in accordance with the present invention that through the arresting means controllable by the control device, a form locking connection (positive) connection for receiving the clamping support force is produced. An especially comfortable and simple to operate quick chuck can be provided in this manner. Great activation forces for force-transmitting fixing of the arresting means can be avoided, and a low wear of the arresting means over a longer service life can be provided. Also, a high percussion drilling strength can be obtained or a tool can be secured in the quick chuck with a higher clamping force which is suitable for a percussion drilling operation.

Furthermore, a predetermined sequence of method steps can be guaranteed by the control device in a simple manner. Thereby a multi-part actuating device and/or a complicated operational sequence to be performed by an operator can be avoided.

When the arresting means is supported movably in a radial direction, it can be integrated in a space-saving manner and structurally controlled simply through a control means, in particular through a control means which is turnable relative to the arresting means. The control means can be advantageously formed as a ring and arranged in a space-saving manner inside the arresting means. Basically, it is also possible that the arresting means, alternatively or additionally, can be formed so as to be supported movably in a circumferential and/or in an axial direction.

In accordance with a further embodiment of the present invention the arresting means is loaded in at least one operational position by at least one spring element. An undesired jamming of the arresting means can be avoided and the arresting means in addition can be used advantageously for finding of preferable fixing positions. For this purpose one or several arresting means can be loaded radially outwardly, and/or one or several arresting means can be loaded radially inwardly.

When the actuating element for clamping a tool is supported rotatably, structurally simple transmissions can be advantageously provided, in particular through thread connections, and is possible to obtain great clamping forces with small actuating forces. With the control device it is possible to turn the actuating element for clamping, preferably less than by 250°, so that a particularly comfortable clamping of a tool can be achieved. Basically it is also possible that instead of thread connections, lever mechanisms and the like are utilized.

It is advantageous when the actuating element is supported displaceably in an axial direction. Thereby an axial actuation of a quick adjustment is provided and a simple, self-clearing operation can be obtained.

It is further proposed to operationally uncouple the actuating element over at least one actuation region from the control means of the control device. Narrow tolerances and the resulting undesired consequences, such as high manufacturing costs, sensitivity to dirt, etc., can be avoided. It can be advantageous to first provide locking and then clamping. A structurally simple solution can be provided when the actuating element can be coupled to and uncoupled from the control means through a locking spring.

The locking spring can be formed by springs of different types which are known to a person skilled in the art. For example, it can be formed as a helical spring and the like. When the locking spring has a substantially ring-shaped design, it can be integrated in an especially space-saving manner.

In accordance with a further embodiment of the present invention it is proposed that the quick chuck has at least one clamping jaw which is loadable in an axial direction by a spring element in at least one operating position. An automatic closing of the quick chuck to a predetermined degree can be provided, and the comfort can be increased.

When the quick chuck has at least one clamping jaw which is loadable in at least one operating position through a means in a radial direction, in particular in a radial direction inwardly, an undesired jamming of the clamping jaw can be reliably avoided.

The means can be formed by a transmission means with an inclined surface and/or by a spring means, etc.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
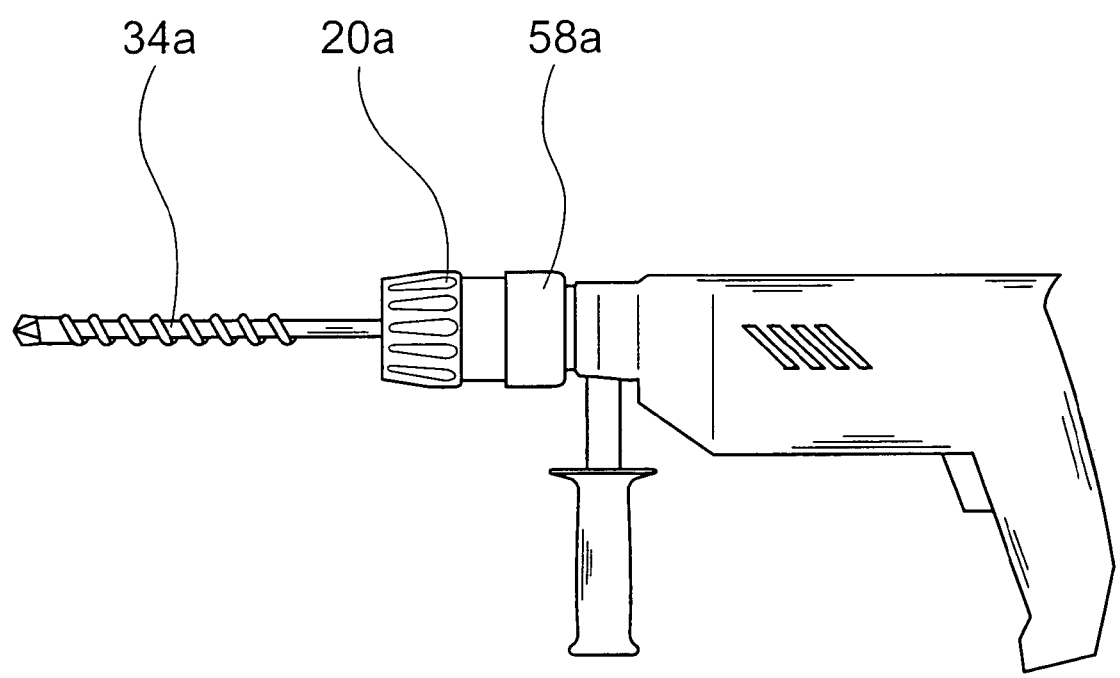
FIG. 1 is a view showing an impact drilling power tool with a quick chuck in accordance with the present invention.
Figure 2:
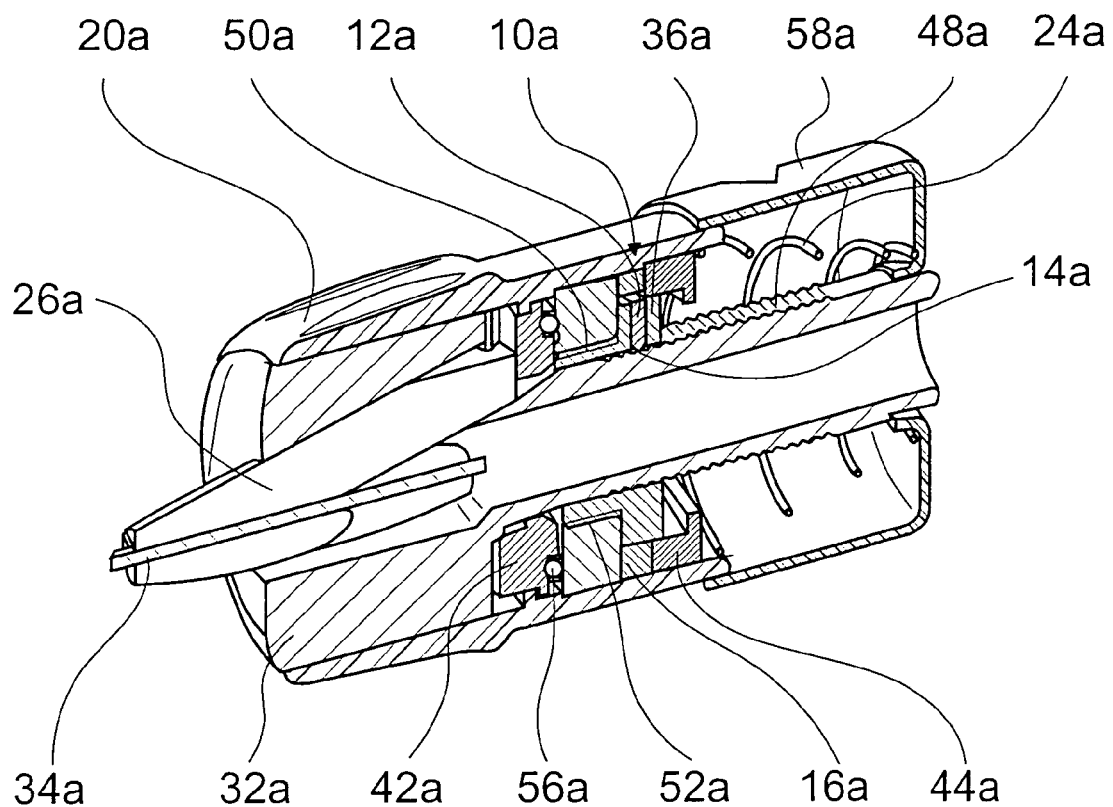
FIG. 2 is a view showing a longitudinal section through the inventive quick chuck inclinedly from above with a tool having a small diameter.
Figure 3:
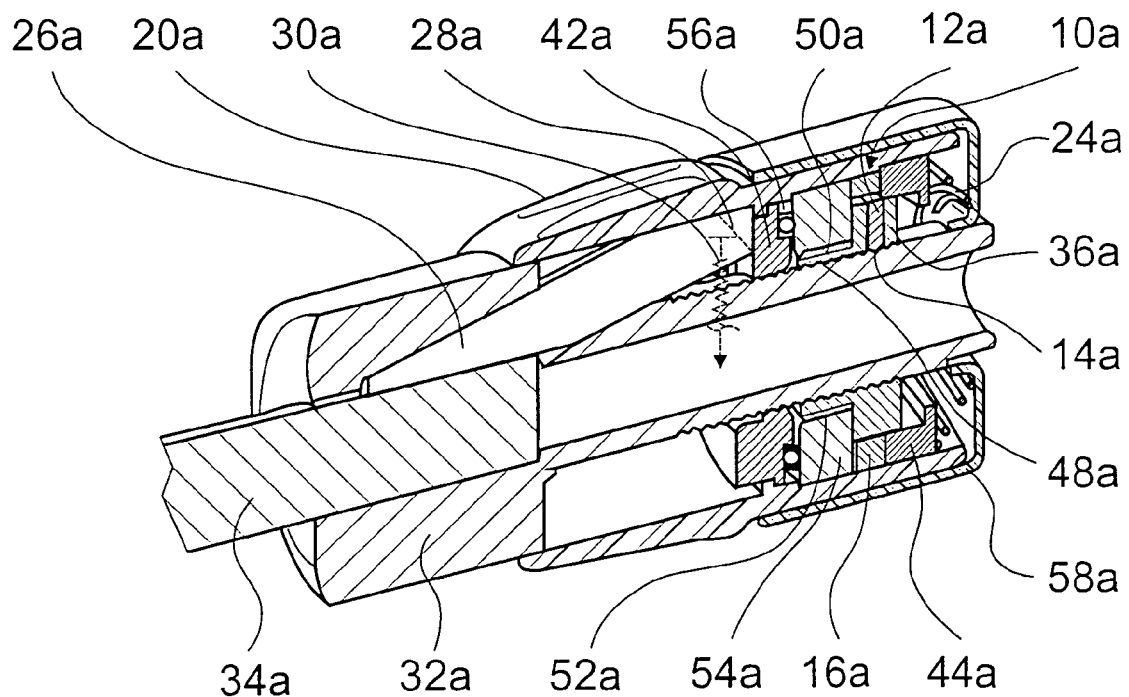
FIG. 3 is a view showing the quick chuck of FIG. 2 with a tool having a great diameter.
Figure 4:
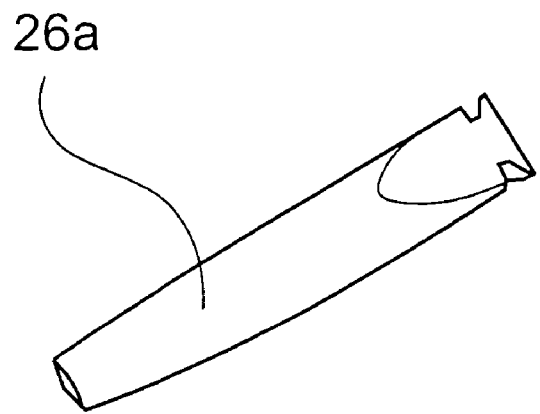
FIG. 4 is a view showing a clamping jaw of the quick chuck illustrated separately, in accordance with the present invention.
Figure 5:
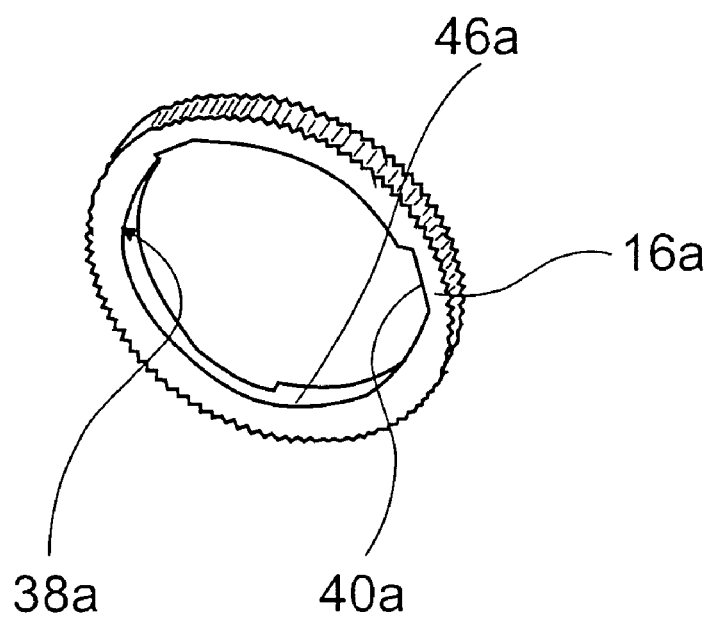
FIG. 5 is a view showing a control wing of the quick chuck illustrated separately, in accordance with the present invention.
Figure 6:
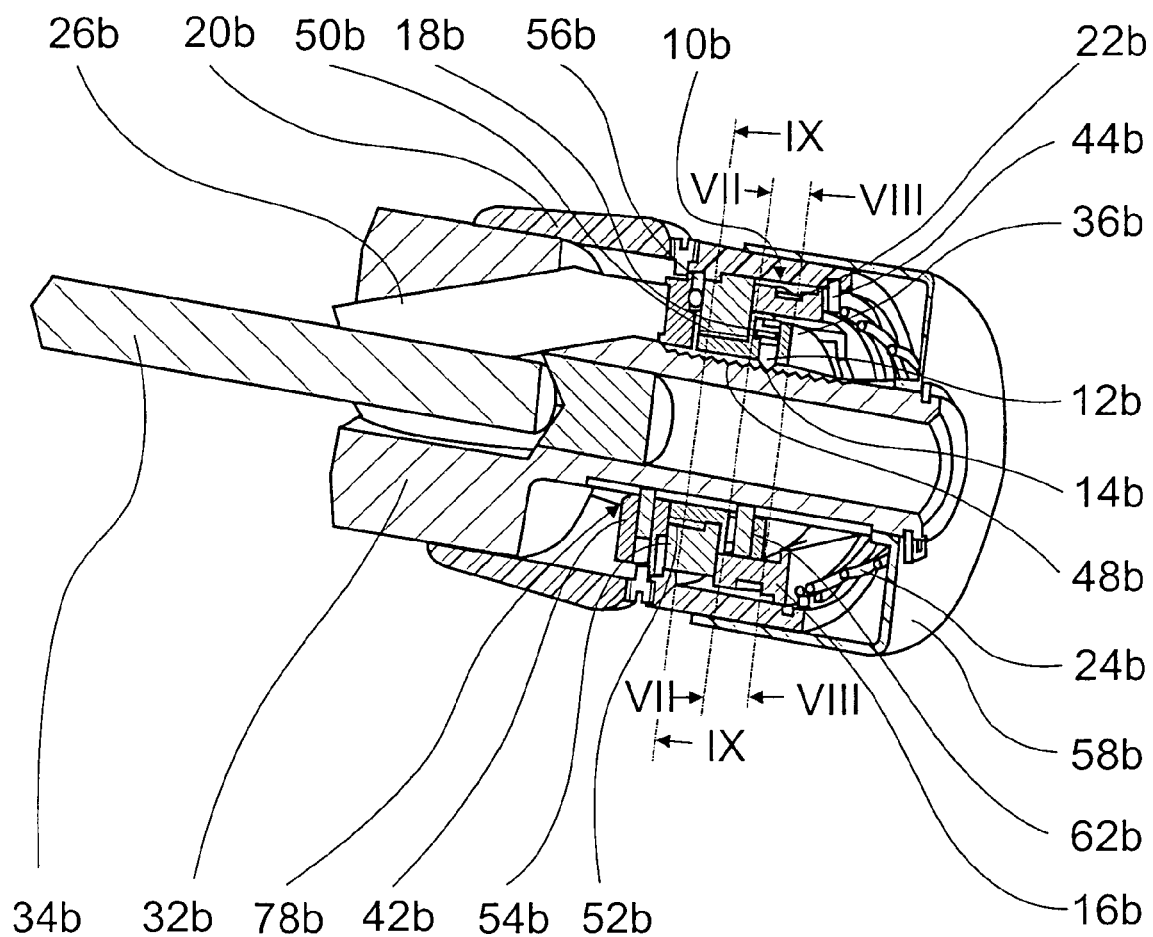
FIG. 6 is a view showing a longitudinal section through an alternative quick chuck with an actuating sleeve uncoupled from a control ring.
Figure 7:
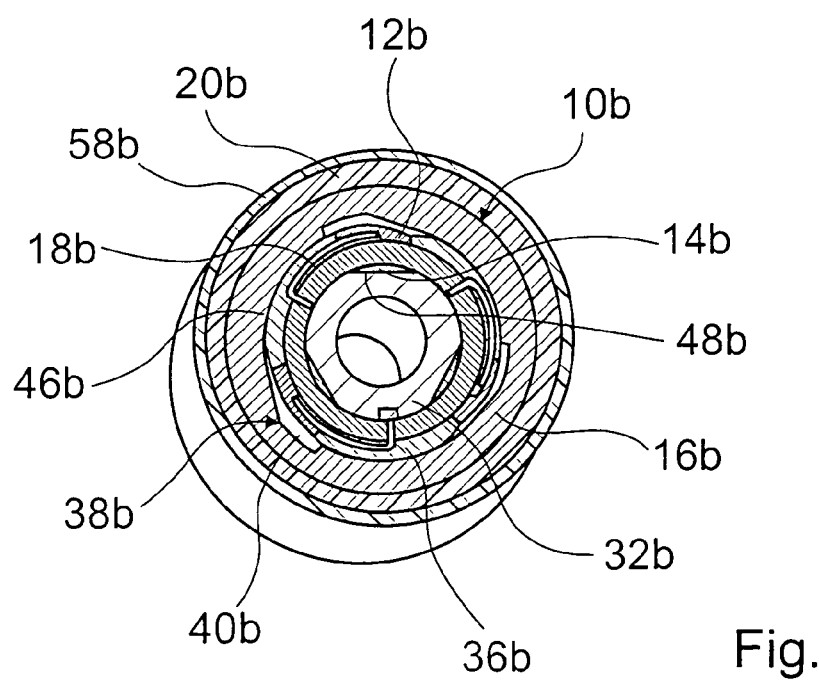
FIG. 7 is a view showing a transverse cross-section through the quick chuck of FIG. 6 taken along the line VII—VII.

FIG. 1 shows a impact drilling power tool with an inventive quick chuck. The quick chuck has a base body 33a, and three clamping jaws 26a which are uniformly distributed over a circumference and displaceably supported in recesses which are inclined radially inwardly toward a free end, as shown in FIGS. 2–4. With an actuating sleeve 20a which is supported rotatably and axially displaceably, tools 34a, 34a' with different diameters can be clamped via the clamping jaws 26a.

The actuating sleeve 20a is composed of plastic and is connected with a control device 10a for joint rotation therewith through an inner toothing and also through an outer toothing of a control ring 16a arranged radially inwardly of the actuating sleeve 20a. Control cams 38a are formed on the inner periphery on the control ring 16a. The arresting means 12a for receiving a clamping support force are distributed radially inwardly of the control ring 16a over a periphery and displaceably supported in a fixing sleeve 36a in a radial direction. The arresting means 12a are controllable by the control cams 30a of the control ring 16a.

When the actuating sleeve 20a is located in direction toward a free end in a defined end position associated with an opening position counterclockwise, the control; ring 16a is located with first partial portions 40a of the control curves 38a over the arresting means 12a, in which the control ring 16a has a relatively great inner diameter, so that the arresting means 12a are movable outwardly.

When a tool 34a is introduced into the quick chuck, the actuating sleeve 20a is pulled axially rearwardly in the direction facing away from the free end. Thereby the clamping jaws 26a which are coupled through a guiding sleeve 42a in axial direction form-lockingly with the actuating sleeve 20a, are guided rearwardly in a direction facing away from the free end and radially outwardly.

The guiding sleeve 42a is supported axially displaceably on the base body 32a and is connected for joint rotation with the base body 32a through a not shown form-locking connection. Basically the guiding sleeve 42a can be however supported also rotatably relative to the base body 32a. Instead of pulling back the actuating sleeve 20a rearwardly, also the free end of the clamping jaw 26a can be pressed with the tool 34a and the clamping jaw 26a can be inserted in the axial direction into the quick chuck until the tool 34a can be inserted between the clamping jaws 26a.

When the tool 34a is inserted between the clamping jaws 36a and the actuating sleeve 20a is released by the operator, it is displaced through a helical pressure spring 24a in direction to the free end of the quick chuck. The helical pressure spring 24a is supported against a cover sleeve 58a and acts through a holding ring 44a, which is provided for securing the arresting means 12a in the fixing sleeve 36a in the axial direction facing away from the free end, on the actuating sleeve 20a which acts with an axial force on the clamping jaws 26a through the guiding sleeve 42a. During turning over of the control ring 16a or in other words with a turning angle greater than 120°, the holding ring 44a comes to use. The arresting means 12a are held in engagement by the holding ring 44a. The clamping jaws 26 can be guided radially inwardly along the inclined surfaces of the recesses in the base body 32a by the axial force, and thereby can secure the tool 34a with a small clamping force.

For manual clamping of the tool 34a with the clamping force applied for the operation, the actuating sleeve 20a, when considered in direction toward the free end is turned in clockwise direction. Basically the tool 34a is clamped with a rotary movement opposite to the clockwise direction, for example with a left thread. The control ring 16a which is connected with the actuating sleeve 20a for joint rotation therewith, is turned relative to the arresting means 12a and to the fixing sleeve 36a, which is axially displaceably supported on the base body 32a and coupled with the base body 32a for joint rotation therewith through a not shown form-locking connection. With the relative movement between the control ring 16a and the arresting means 12a, the control cams 38a come to a position with second partial portions 46a through the arresting means 12a, in which the control ring 16a has a relatively small inner diameter. The arresting means 12a are pressed through the control ring 16a with its radially inwardly extending, injection molded ends, in a toothing 48a which is formed on an outer periphery of the base body 32a.

Through the arresting means 12a controllable by the control device 10a a form-locking connection 14a for receiving the clamping support forces is produced, and in particular in an axial direction between the arresting means 12a and the base body 32a.

With the rotary movement of the actuating sleeve 20a, in addition a clamping sleeve 54, which is coupled for joint rotation with the actuating sleeve 20a, is turned relative to the fixing sleeve 36a. The clamping sleeve 54a is coupled with the fixing sleeve 36a through an inner thread 50a formed on it and through an outer thread 52a of the fixing sleeve 36a.

The rotary movement of the clamping sleeve 54, due to the thread 50a, 52a leads to an axial movement of the clamping sleeve 54a, and it acts with an axial force through an axial bearing 56a and through the guiding sleeve 42a on the clamping jaws 26a which are pressed radially inwardly along the inclined surfaces of the recesses in the base body 32a and clamp the tool 34a.

For releasing the quick chuck, the actuating sleeve 20a, when considered in direction toward the free end of the quick chuck, is turned opposite to the clockwise direction. The clamping sleeve 54a is guided in the direction facing away from the free end, and the clamping force is lifted until the clamping force which is caused by the helical pressure spring 24a. Furthermore, the first partial portions 40a of the control cams 38a are guided over the arresting means 12a, and the arresting means 12a are released in the radial direction outwardly.

The actuating sleeve 20a can be pulled axially rearwardly in the direction facing away from the free end and the quick chuck can be completely open. The radially inwardly facing, injection molded ends of the arresting means 12a can be determined with respect to the toothing 48a so that they overlatch during rearward pulling of the actuating sleeve 20a.

For avoiding tilting of the clamping jaws 26a in the recesses of the base body 32a, they can be loaded in a radial direction inwardly by one or several means 28a, 30a. For example, they can be loaded by one or several means 30a formed by spring elements, or by one means 28a formed by an incline of the guiding sleeve 42a and/or by one means formed by an incline on the clamping jaws 26a, as schematically shown in FIG. 3.

FIGS. 6–9 shown an alternative quick chuck in accordance with the present invention. In these embodiments the components which are substantially the same are identified with the same reference numerals. In order to distinguish between embodiments, the letters "a" and "b" are introduced. Furthermore, the same features and functions are not repeatedly described but instead they correspond to the description of the embodiments shown in FIGS. 1–5.

The quick chuck has an actuating sleeve 20b, which is operatively uncouplable over one actuating region by a control ring 16b of a control device 10b. In particular, it is uncoupled through a locking spring 22b which is formed by a band-shaped spring steel, has a substantial ring-shaped design and is arranged in a peripheral groove of the control ring 16b.

When the actuating sleeve 20b, as considered in direction facing the free end, is located in a defined end position associated with an opening position and opposite to the clockwise direction, the control ring 16b is located with a first partial portion 40b of the control cam 38b over the arresting means 12b, in which the control ring 16b has a relatively great inner diameter, so that the arresting means 12b are movable outwardly. Three arresting means 12b are arranged so that they are offset in a circumferential direction approximately over 120°.

When a tool 34b must be inserted in the quick chuck, the actuating sleeve 20b is pulled axially rearwardly in the direction facing away from the free end. Thereby the clamping jaws 26b which are coupled through a guiding sleeve 42b in an axial direction form-lockingly with the actuating sleeve 20b, are guided rearwardly and radially outwardly in the direction facing away from the free end. The guiding sleeve 42b is supported axially displaceably on the base body 32b, and is connected for joint rotation with the base body 32b through a key-groove connection 80b. In addition to the key-groove connection 80b another connection which is known to a person skilled in the art can be used as well.

When the tool 34b is inserted between the clamping jaws 26b and the actuating sleeve 20b is released by the operator, it is displaced by a helical pressure spring 20b in direction to the free end of the quick chuck. The helical pressure spring 24b is supported against a cover sleeve 58b and acts through a holding ring 44b on the actuating sleeve 20b, which acts with an axial force through an axial bearing 56b and through the guiding sleeve 42b, on the clamping jaws 26b. By the axial force, the clamping jaws 26b are guided radially inwardly along the inclined surfaces of the recesses in a base body 32b and secure the tool 34b with a small clamping force.

For manual clamping of the tool 34b with a clamping force provided for the operation, the actuating sleeve 20b, when considered in direction to the free end, is turned in clockwise direction. With the actuating sleeve 20b the control ring 16b, which is coupled through a recess 66b, the locking spring 22b and through a recess 60b on the inner periphery of the actuating sleeve 20b with the same, is turned relative to the arresting means 12b and relative to a fixing sleeve 36b, which is axially displaceably supported on the base body 32b and coupled through a key-groove connection 62b non-rotatably with the base body 32b.

With the relative movement between the control ring 16b and the arresting means 12b, the control cams 38b come to location with the second partial portion 14b over the arresting means 12b, in which the control ring 16a has a relatively small inner diameter. The arresting means 12b are pressed through the control ring 16b with its radially inwardly facing ends in a toothing 48b formed on an outer periphery of the base body 32b. Three toothings 48b which are offset approximately by 120° in a peripheral direction, are formed on the base body 32b. The base body 32b forms guiding surfaces for the guiding sleeve 42b and the fixing sleeve 36b between the toothings 48b in the peripheral direction. Through the arresting means 12b controllable by the control device 10b, a form-locking connection 14b is produced for receiving the clamping support force, and in particular in an axial direction between the arresting means 12b and the base body 32b.

Figure 8:
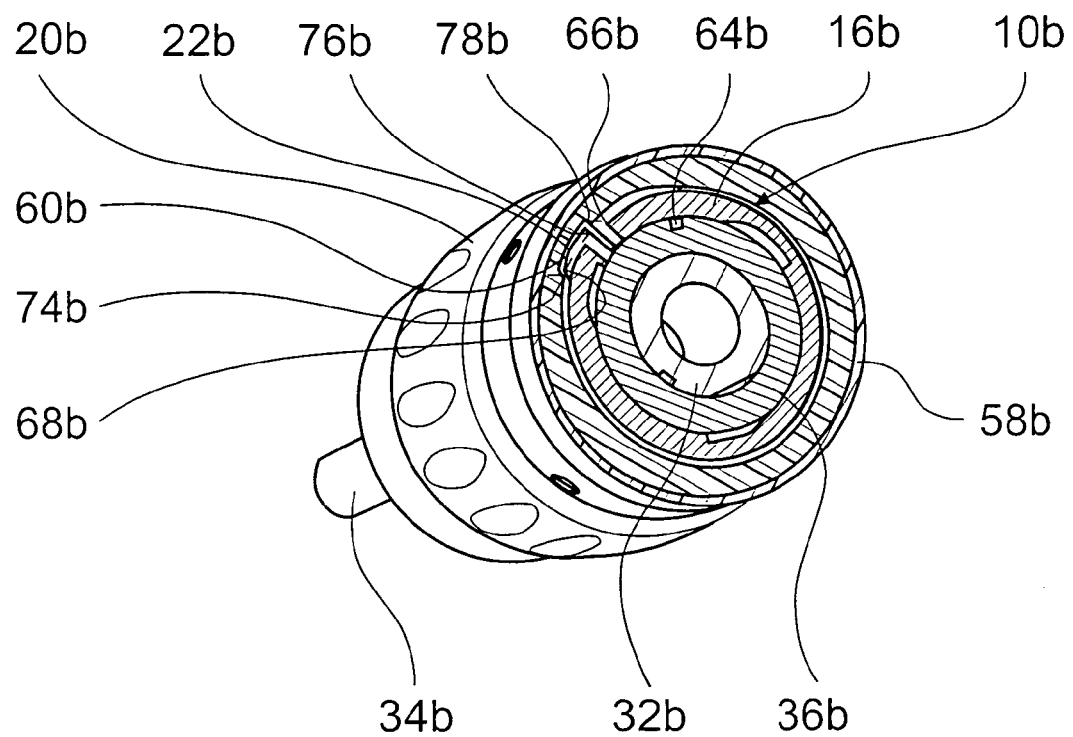
FIG. 8 is a view showing a section through the quick chuck of FIG. 6 taken along the line VIII—VIII.

When the fixing sleeve 36b is fixed through the arresting means 12b in an axial direction form-lockingly on the base body 32b, the locking spring 22b comes to a position with a radially inwardly facing end over a depression 64b of the fixing sleeve 36b. It is arrested in it and can travel over the inclined surface 68b which is formed on the actuating sleeve 20b and follows the recess 60b. The inclined surface 68b corresponds to the inclined surface 74b formed on the locking spring 22b as shown in FIG. 8. The actuating sleeve 20b and the control ring 16b are operatively uncoupled.

Figure 9:
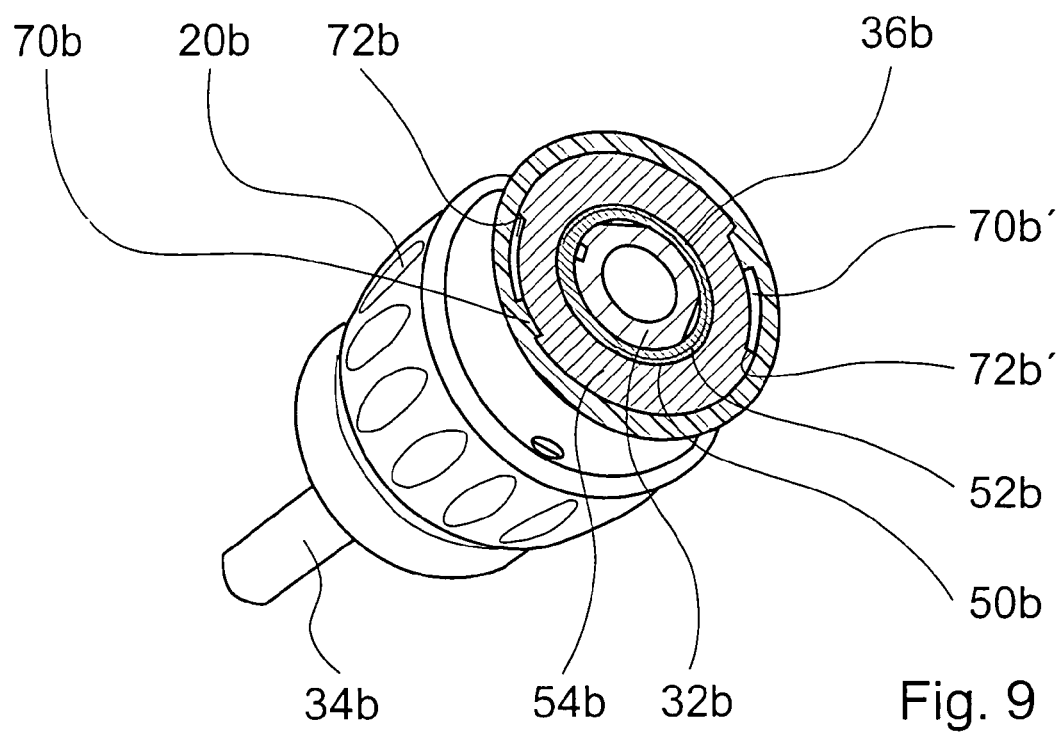
FIG. 9 is a view showing a cross-section through the quick chuck of FIG. 6 taken along the line IX—IX.

Substantially when the actuating sleeve 20b is uncoupled from the control ring 16b, the actuating sleeve 20b comes to abutment against the abutment surfaces 72b, 72b' of a clamping sleeve 54b through radially inwardly facing projections 70b, 70b' formed on the inner periphery. Thereby it is coupled with them in a rotary direction, when considered in direction toward the free end, in the clockwise direction as shown in FIG. 9.

After this, by the rotary movement of the actuating sleeve 20b, the clamping sleeve 54b is then turned relative to the fixing sleeve 36b, and clamping sleeve 54b is coupled with the fixing sleeve 36b through an inner thread 50b formed on the clamping sleeve 54 and through an outer thread 52b of the fixing sleeve 36b.

The rotary movement of the clamping sleeve 54b, because of the threads 50b, 52b, leads to an axial movement of the clamping sleeve 54b. It acts with an axial force through the axial bearing 56b and through the guiding sleeve 42b, on the clamping jaws 26b which are pressed radially inwardly along the inclined surfaces of the recesses in the base body 32b and clamp the tool 34b.

For releasing the quick chuck, the actuating sleeve 20b, when considered in direction to the free end of the quick chuck, is turned opposite to the clockwise direction. The clamping sleeve 54b is guided in the direction which faces away from the free end, and the clamping force is lifted until the clamping force caused by the helical pressure spring 24b.

Furthermore, the actuating sleeve 20b comes to abutment against an abutment surface 70b of the locking spring 22b, with its abutment surface 76b which is formed on its inner periphery and follows the recess 60b, and guides it from the depression 64b, and in particular by a pre-tensioning of the locking spring 22 which acts outwardly in a radial direction outwardly.

The control ring 16b is coupled with the actuating sleeve 20b through the locking spring 22b, the first partial portion 40b of the control cams 38b is guided through the arresting means 12b, and the arresting means 12b are released in the radial direction outwardly.

The actuating sleeve 20b can be pulled axially rearwardly in the direction facing away from the free end, and the quick chuck can be opened completely. The radially inwardly facing, injection molded ends of the arresting means 12b are determined with respect to the toothing 48b so that during pulling rearwardly of the actuating sleeve 20*b* they are overlatched. Two arresting means 12*b* are loaded outwardly in a radial direction through bracket-shaped spring elements 18*b* with a spring force, and one of the arresting means 12*b* is loaded radially inwardly with a spring force through a bracket-shaped spring element 18*b*.

Instead of the individual spring elements 18*b*, several arresting means 12*b* can be loaded with spring forces by a single spring element, for example a ring-shaped wire spring.

It will be understood that each of the elements described above, or two or more together, may also find a useful application in other types of constructions differing from the types described above.

While the invention has been illustrated and described as embodied in a quick chuck, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A quick chuck for a hand power tool, comprising clamping means for clamping a tool; an actuating element for actuating said clamping means; at least one arresting means for receiving a clamping support force of said clamping means; a control device having at least one control means for controlling said at least one arresting means, said arresting means controllable by said control device producing a form-locking connection with a part of the quick chuck for receiving the clamping support force.

2. A quick chuck as defined in claim 1, wherein said arresting means is supported movably in an arresting direction.

3. A quick chuck as defined in claim 1, wherein said control means is supported rotatably relative to said arresting means.

4. A quick chuck as defined in claim 1; and further comprising at least one spring element which loads said arresting means at least in an operational position.

5. A quick chuck as defined in claim 1, wherein said actuating element is supported turnably for clamping a tool.

6. A quick chuck as defined in claim 1, wherein said actuating element is supported displaceably in an axial direction.

7. A quick chuck as defined in claim 1, wherein said control means of said control device have at least one actuating region which is operatively decouplable.

8. A quick chuck as defined in claim 7; and further comprising a locking spring through which said actuating element is couplable and decouplable with said control means.

9. A quick chuck as defined in claim 8, wherein said locking spring is substantially ring-shaped.

10. A quick chuck as defined in claim 1; and further comprising at least one clamping jaw which is loadable in an axial direction in at least one operational position through a spring element.

11. A quick chuck as defined in claim 1; and further comprising at least one clamping jaw; and means for loading said at least one clamping jaw in a radial direction in at least one operational position.

12. A hand power tool, comprising clamping means for clamping a tool; a quick chuck including an actuating element for actuating said clamping means; at least one arresting means for receiving a clamping support force of said clamping means; a control device having at least one control means for controlling said at least one arresting means, said arresting means controllable by said control device producing a form-locking connection with a part of the quick chuck for receiving the clamping support force.

13. A quick chuck as defined in claim 1; and further comprising a base body in which said clamping means is located and which form said part of the quick chuck, said form-locking connection being provided in an axial direction between said arresting means and said base body.

14. A hand power tool as defined in claim 12; and further comprising a base body in which said clamping means is located and which form said part of the quick chuck, said form-locking connection being provided in an axial direction between said arresting means and said base body.

* * * * *